(12) United States Patent
Rankine

(10) Patent No.: US 10,701,459 B2
(45) Date of Patent: Jun. 30, 2020

(54) AUDIO-VIDEO CONTENT CONTROL

(71) Applicant: BRITISH BROADCASTING CORPORATION, London (GB)

(72) Inventor: Simon Rankine, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 15/739,411

(22) PCT Filed: Jun. 30, 2016

(86) PCT No.: PCT/GB2016/051986
§ 371 (c)(1),
(2) Date: Dec. 22, 2017

(87) PCT Pub. No.: WO2017/001860
PCT Pub. Date: Jan. 5, 2017

(65) Prior Publication Data
US 2018/0184179 A1 Jun. 28, 2018

(30) Foreign Application Priority Data
Jun. 30, 2015 (GB) .................................. 1511450.7

(51) Int. Cl.
*H04N 21/84* (2011.01)
*H04N 21/234* (2011.01)
(Continued)

(52) U.S. Cl.
CPC .......... *H04N 21/84* (2013.01); *G11B 27/031* (2013.01); *G11B 27/105* (2013.01); *G11B 27/28* (2013.01);
(Continued)

(58) Field of Classification Search
CPC ............. H04N 21/84; H04N 21/23418; H04N 21/266; G11B 27/031; G11B 27/105; G11B 27/28; G11B 27/34
See application file for complete search history.

(56) References Cited

U.S. PATENT DOCUMENTS

2003/0103565 A1   6/2003  Xie et al.
2006/0071078 A1*  4/2006  Olmstead ........... G06K 7/10851
                                                235/462.01
(Continued)

FOREIGN PATENT DOCUMENTS

GB       1 336 498          11/1973
WO       WO 94/16443          7/1994
WO       WO 2014/207442 A1  12/2014

OTHER PUBLICATIONS

International Search Report of the ISA for International Appl. No. PCT/GB2016/051986 dated Sep. 27, 2016; 4 pages.
(Continued)

*Primary Examiner* — Thai Q Tran
*Assistant Examiner* — Sunghyoun Park
(74) *Attorney, Agent, or Firm* — Daly, Crowley, Mofford & Durkee LLP

(57) ABSTRACT

A controller for controlling the output of an audio-video feed has an input for receiving audio-video content and a vector engine arranged to produce a continuous metadata value of M dimensions at intervals from the audio-video content. The metadata value may indicate aspect of the video content such as rate, pace, tone or other such information. A low pass filter and hysteresis filter are then provided to filter the continuous metadata value to produce a binary output. The binary output is provided to a retrieval module arranged to control the audio-video content in dependence upon the
(Continued)

binary output. In this way, automated segmentation of audio-video content may be reliably achieved.

20 Claims, 4 Drawing Sheets

(51) Int. Cl.
G11B 27/10 (2006.01)
G11B 27/28 (2006.01)
G11B 27/031 (2006.01)
G11B 27/34 (2006.01)
H04N 21/266 (2011.01)

(52) U.S. Cl.
CPC ....... *G11B 27/34* (2013.01); *H04N 21/23418* (2013.01); *H04N 21/266* (2013.01)

(56) References Cited

U.S. PATENT DOCUMENTS

| | | | | |
|---|---|---|---|---|
| 2007/0242880 | A1* | 10/2007 | Stebbings | G06F 21/10 382/172 |
| 2009/0115908 | A1* | 5/2009 | Walls | H04N 5/145 348/699 |
| 2009/0285551 | A1* | 11/2009 | Berry | G06K 9/00711 386/249 |
| 2010/0020933 | A1* | 1/2010 | Topfer | G06T 5/50 378/98.11 |
| 2012/0321273 | A1* | 12/2012 | Messmer | G11B 27/031 386/224 |
| 2013/0050254 | A1* | 2/2013 | Tran | G06F 3/14 345/629 |
| 2013/0302006 | A1* | 11/2013 | Previti | H04N 9/79 386/224 |
| 2014/0232818 | A1 | 8/2014 | Carr et al. | |
| 2015/0237341 | A1* | 8/2015 | Diggins | G06K 9/00744 348/180 |
| 2015/0382063 | A1* | 12/2015 | Eggink | H04N 21/252 725/14 |
| 2016/0203600 | A1* | 7/2016 | Abdolell | A61B 6/502 382/132 |
| 2016/0254028 | A1* | 9/2016 | Atkins | H04N 5/147 386/241 |

OTHER PUBLICATIONS

Written Opinion of the ISA for International Appl. No. PCT/GB2016/051986 dated Sep. 27, 2016; 7 pages.
Communication pursuant to Article 94(3) EPC, Examination Report for EP 16 744 832.3-1208, dated Oct. 30, 2019, 5 pages.

* cited by examiner

AUDIO-VIDEO CONTENT CONTROL

CROSS REFERENCE TO RELATED APPLICATIONS

This application is a U.S. National Stage of PCT application PCT/GB2016/051986 filed in the English language on Jun. 30, 2016, and entitled "AUDIO-VIDEO CONTENT CONTROL," which claims priority to United Kingdom application GB1511450.7 filed Jun. 30, 2015, which application is hereby incorporated herein by reference.

BACKGROUND OF THE INVENTION

This invention relates to a system and method for allowing control of output of audio-video content.

Audio-video content, such as television programmes, comprises video frames and an accompanying sound track which may be stored in any of a wide variety of coding formats, such as MPEG-2 or MPEG-4. The audio and video data may be multiplexed and stored together or stored separately. In either case, a programme comprises such audio video content as defined by the programme maker. Programmes include television programmes, films, news bulletins and other such audio video content that may be stored and broadcast as part of a television schedule. Audio-video content as described herein thus includes content that comprises audio, video or both audio and video.

SUMMARY OF THE INVENTION

We have appreciated the need to improve systems and methods by which audio video content such as programmes and portions of programmes may be controlled and output.

In broad terms, the invention provides a controller for controlling the output of audio-video content such as programmes received either as a live feed or retrieved from a store such as an audio-video player. The controller is arranged to analyse the audio-video stream, to produce a vector at intervals that correlates to a defined ground truth and to operate a two-stage filtration process on the vector. The output of the two-stage filtration process is provided to a retrieval module which allows control such as providing the audio-video data to a display or transmitter for output, or controlling a player to provide different content or jump to a new location within the programme being processed.

An example advantageous use case for a controller embodying the invention is in the analysis of a live feed to determine a fault condition. A live feed of an audio-video programme such as coverage of a football match will comprise various aspect such as camera motion, shot changes, changes in audio from the crowd and commentator and so on. However, if a faulty camera is selected or indeed the entire feed changes in a material way such as by selecting a camera not correctly viewing the game, this condition should be detected at the earliest opportunity so as to substitute audio-video content either by changing camera or by retrieving prior audio-video data such as an action replay from the store of a player. Using the invention, a controller can rapidly detect a variety of conditions such as described above, or indeed different "chapters" such as the game being stopped due to injury or half time and to control the output accordingly.

BRIEF DESCRIPTION OF THE DRAWINGS

The invention will now be described in more detail by way of example with reference to the drawings, in which.

DETAILED DESCRIPTION OF THE PREFERRED EMBODIMENTS

The invention may be embodied in a variety of methods and systems for allowing control of the output of audio video content such as programmes. The main embodiment described is a controller for control of recorded or live programmes to be output on a local display and/or provided to a transmitter for broadcast.

A controller embodying the invention is particularly beneficial for rapid analysis of a live audio-video feed to determine that a condition has occurred such that the controller should, instead of presenting the live feed as an output, retrieve alternative content from an audio-video player or store. Such a condition may be a drastic fault such as a frozen feed from a camera or, as sometimes happens with live broadcast, a camera pointing at material that is not relevant. The controller is able to detect such conditions. Whilst described primarily in terms of a live audio-video feed, the controller may equally operate in relation to audio-video programmes provided from an archive.

The embodiment of the invention provides an improved approach to detecting a change in condition from an audio-video feed to avoid both false negatives and false positives. In essence, a controller is of value to broadcasters, researchers and users wishing to provide audio-video output if it correctly identifies the portions of an audio-video programme matching a ground truth.

The embodying system receives audio video programmes, processes the programmes to produce metadata values, referred to as mood vectors, at intervals throughout the programme and controls the output of programmes.

Figure 1:
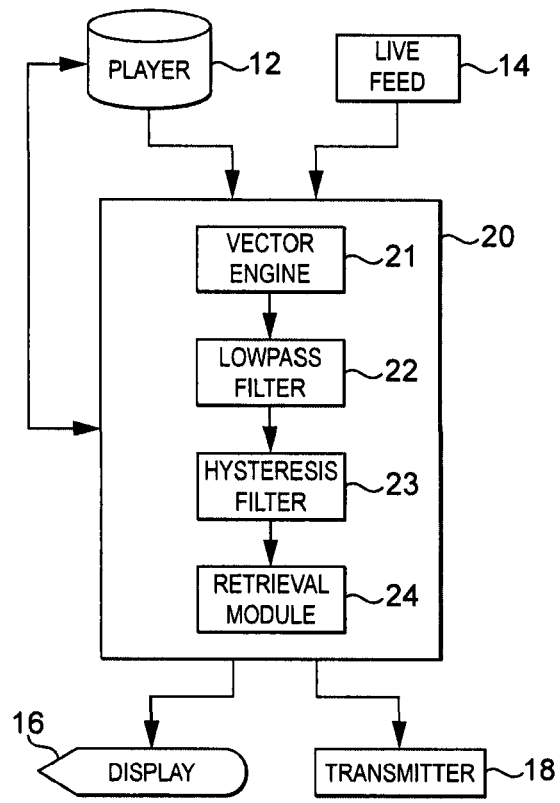
FIG. 1: is a diagram of the main functional components of a system embodying the invention.

A system embodying the invention is shown in FIG. 1.

The system embodying the invention comprises a player 12 having a store of audio-video programmes which may be a high performance live store or a lower performance archive. In addition, live feed input 14 may receive a live feed of an audio-video programme, such as an outside broadcast. A controller 20 receives the retrieved audio-video data and live feed at inputs and provides the live feed and or retrieved programme at outputs for display on a local display 16 or for broadcast via a transmission arrangement, here shown as transmitter 18.

The controller 20 comprises the following components or modules which together operate to determine if the received audio-video stream should be continuously output or whether one or more "chapter" points have occurred. A chapter point may be considered to be the point at which the audio-video feed no longer matches a defined criterion or changes from no longer matching the criterion to resuming matching that criterion. The controller 20 comprises a vector engine 21 which receives the audio-video programme and analyses the programme at intervals to produce a vector that correlates to a ground truth. The ground truth may be derived from characteristics of the audio-video stream itself. The characteristics may be audio or video characteristics described later. The output of the vector engine will be a vector at intervals, the vector relating to the ground truth selected, for example rate, pace, tone or other "mood"

vectors. The vector signal comprising vector values at time intervals is passed to a low pass filter 22 arranged to filter out rapid changes in the vector signal. The filtered vector signal is then provided to a Hysteresis filter arranged to avoid potential "ringing" in the sense of rapidly switching between asserting the presence or absence of the defied condition. The output of the Hysteresis filter 23 is provided to a retrieval module 24 which is arranged to either allow the feed from the player 12 or live feed 14 to pass to the display or transmitter, or to interrupt the provided programme and instead jump to a feature section of an already recorded programme or indeed swap to a different programme as appropriate.

The vector engine 21, low pass filter 22, Hysteresis filter 23 and retrieval module 24 will now be described in further detail.

The vector engine 21 is arranged to process the audio video data of the programme to produce a vector at intervals that represents a predefined quality of the programme such as the "mood" of the programme for that interval. Optionally, the processing module may process other data associated with the programme, for example subtitles, to produce the mood vectors at intervals. The intervals for which the processing is performed may be variable or fixed time intervals, such as every minute or every few minutes, or may be intervals defined in relation to the programme content, such as based on video shot changes or other indicators that are stored or derived from the programme. The intervals are thus useful sub-divisions of the whole programme. Vector production is described in more detail later.

The output of the vector engine may be a vector comprising pace and tone data. Continuing the example of analysing a live feed of a sports event, the pace and tone vector may be used to determine a condition such as a "chapter" of game play, a problem with the live feed and so on as previously described. The main chapterisation will be described as a simple example of determining the first half, second half and the half time interval of a football match.

Figure 3:
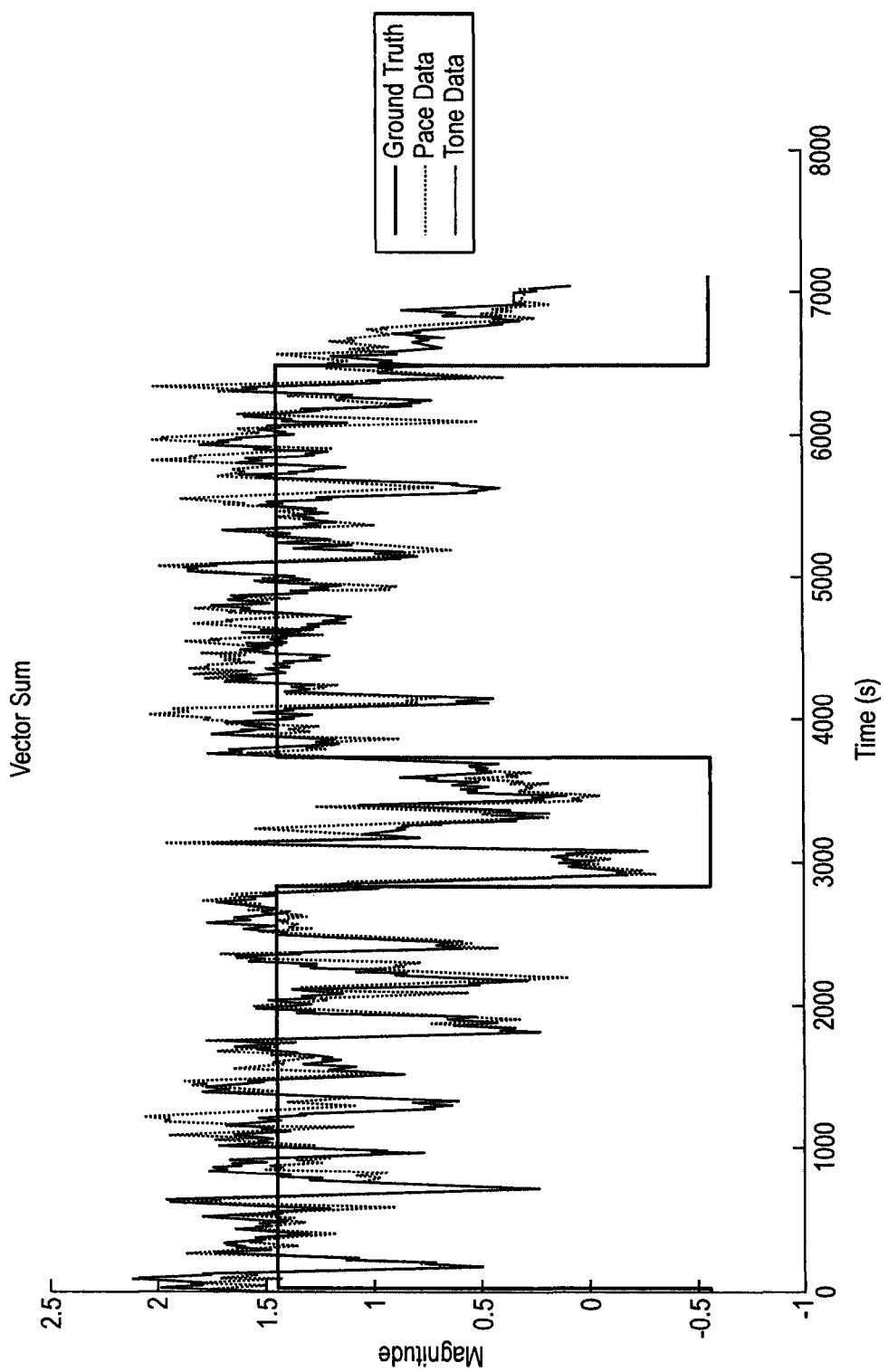
FIG. 3: shows a time line vector value for a first example programme.
Figure 4:
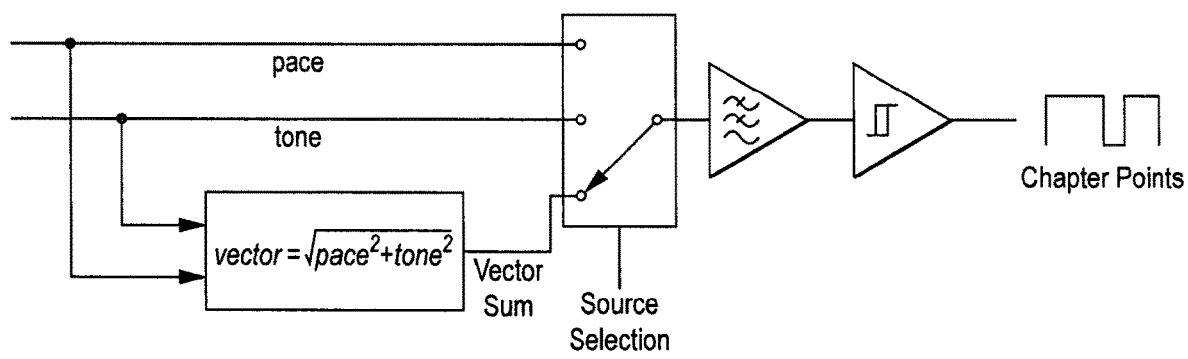
FIG. 4: shows a functional diagram of a controller.

An example of the pace and tone data produced by the mood classification algorithm is illustrated in FIG. 3, with a ground truth overlaid on top. On visual inspection it is apparent that there is some correlation between the mood data and the ground truth of match play. The chapterisation uses this correlation to perform the chapterisation process. The chapterisation may be broken into two distinct sections: a filtering process to remove transient peaks and troughs allowing larger trends to be observed and a detection process which determines which applies a threshold to the data resulting in a binary playing/not playing output. FIG. 4 shows these steps.

Figure 5:
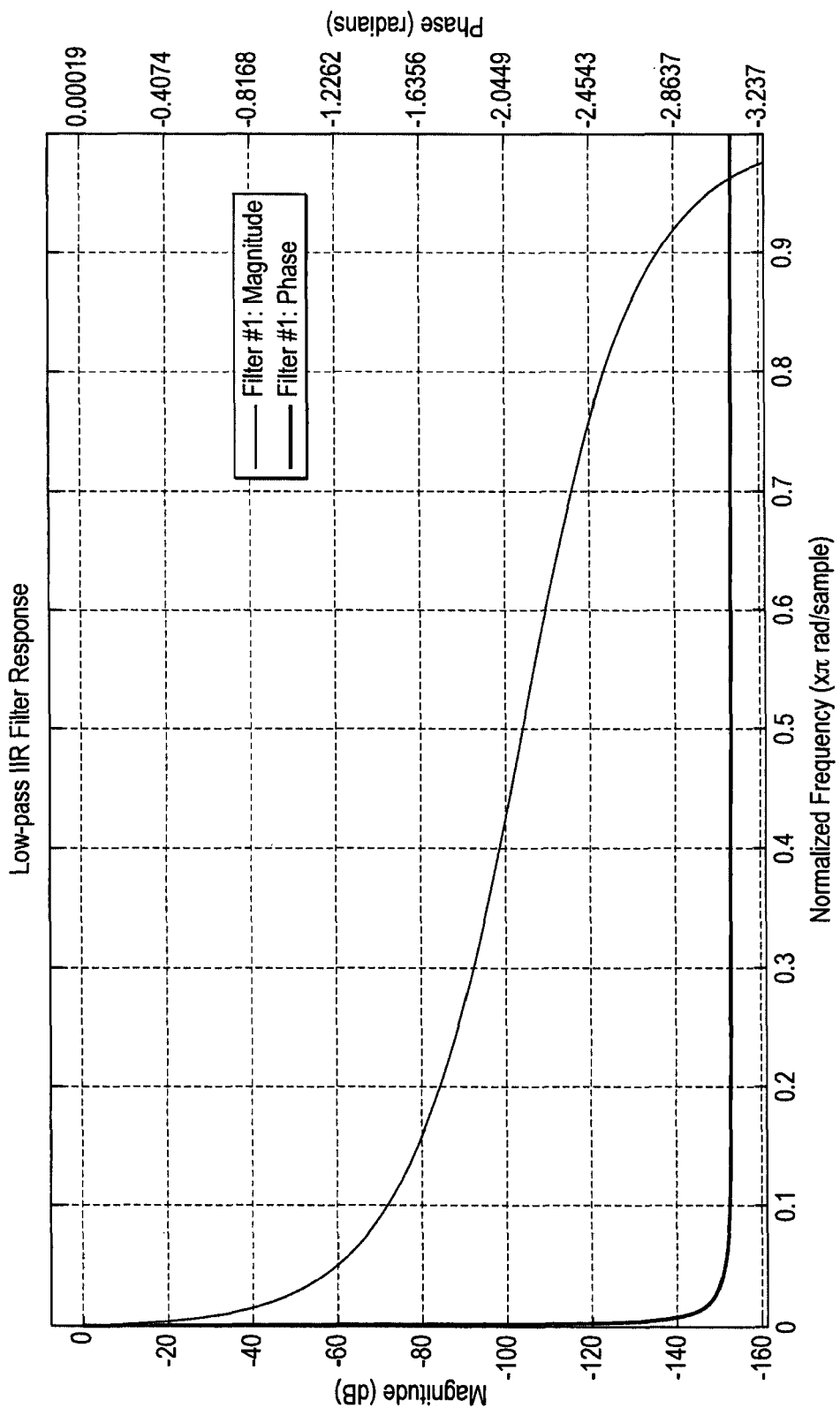
FIG. 5: shows an example filter.

A low pass filter is provided to avoid unwanted transitioning due to transient changes. The low pass filter may have a fixed or variable threshold. The threshold may be determined from analysis of the data. An implementation specific example provides that the mood vector data is filtered by a second order IIR Butterworth filter with a cut-off of 0.0016 of the Nyquist frequency. This very low cut off frequency compared to the Nyquist rate rendered use of an FIR filter impractical in this specific use case, as the number of taps required was excessive (in the order of hundreds of thousands). IIR filters are able to produce a similar response with far fewer polls, usually at the cost of distortion and potential instability. This makes IIR filters a better choice for a variety of use cases. The magnitude and phase response of the filter is illustrated in FIG. 5.

Both the required filter order and cut-off frequency were calculated approximately from the data and then optimised experimentally by plotting error and F1 against each the number of filter taps and cut-off frequency.

After the low pass filtering is applied the data is passed through a Hysteresis filter, one specific example of which is a Schmitt trigger, to produce the binary output waveform. A hysterisis filter is known to the skilled person and takes a continuous input and provides a discrete output based on a threshold. The threshold differs depending upon the direction of the input signal. Early tests used a simple mean crossing detector, however this was susceptible to small fluctuations in the low pass filtered data when the input to the detector was close to the mean value. This would result in oscillation of the output in transition regions. Use of hysteresis ensures that once the transition has taken place the output of the detector remains stable.

The center point of the hysteresis may be set in a variety of ways. In one example, the centre point is determined by taking the average of selected maximum and minimum samples, such as the 20 maximum and 20 minimum samples. This avoids the problem of being dependant on the match shape, but reduces the impact of extreme outliers by using more than one value. In another example, the centre point is the mean value of the smoothed data. The amount of hysteresis used in the embodiment is defined as a function of the standard deviation of the smoothed date, for example as fraction of the standard deviation of the smoothed data. The optimum value of this may be determined experimentally from sample date, in this example to be ⅕ of the standard deviation of the smoothed data.

FIG. 4 summarises the steps undertaken by the arrangement of FIG. 1. As shown, the pace and tone inputs received from the vector engine may be selected by a source selector or alternatively the vector sum of these selected and passed to the low pass filter and Hysteresis filter. The output is a binary output waveform defining the presence or absence of the condition tested, here the presence of the football game being played or its absence. This binary output waveform provided to the retrieval module 24 of FIG. 1 allows either portions of new programme to be skipped (those portions for which the output is low) and effectively fast forwarded to the next "chapter" for a retrieved programme, or to swap to alternative content for a live feed.

The retrieval module could be used to directly control output of audio-video content. Alternatively, the retrieval module may be used to indicate chapter points such as by storing timestamps or a flag along with the audio-video content to be passed to a further controller.

A specific example of vector production will now be given. The example relates to machine learning against a ground truth for "mood". It should be noted, though, that other ground truths may be used such as video quality defined in various ways. Such a ground truth would have use cases such as analysing archived video to determine sections for restoration. Another ground truth would be amount of "activity" within a video sequence. Such a ground truth would be useful for analysing content that has infrequent activity, such as natural history footage, to determine sections of interest.

Vector Production

Figure 2:
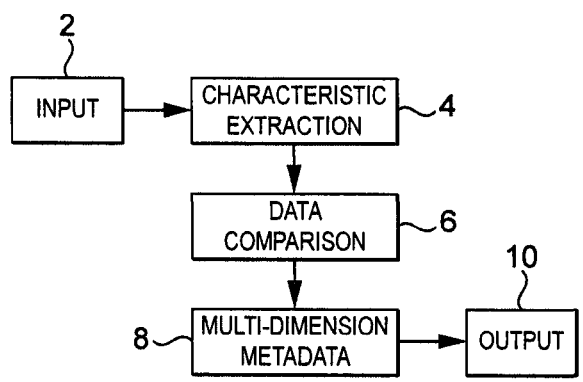
FIG. 2: is a diagram the vector engine of FIG. 1.

The production of the metadata referred to as mood vectors by the processing module 3 will now be described for completeness with reference to FIG. 2. The system comprises an input 2 for receiving the AV content, for example, retrieved from an archive database. A characteristics extraction engine 4 analyses the audio and/or video data to produce values for a number of different characteristics, such as audio frequency, audio spectrum, video shot changes, video luminance values and so on. A data comparison unit 6 receives the multiple characteristics for the content and compares the multiple characteristics to characteristics of other known content to produce a value for each characteristic. Such characteristic values, having been produced by comparison to known AV data, can thereby represent features such as the probability of laughter, relative rate of shot changes (high or low) existence and size of faces directed towards the camera. A multi-dimensional metadata engine 8 then receives the multiple feature values and reduces these feature values to a complex metadata value of M dimensions which may be referred to as a mood vector.

The extracted features may represent aspects such as laughter, gun shots, explosions, car tyre screeching, speech rates, motion, cuts, faces, luminance and cognitive features. The data comparison and multi-dimensional metadata units generate a complex metadata "mood" value from the extracted features. The complex mood value has humorous, serious, fast paced and slow paced components. The audio features include laughter, gun shots, explosions, car tyre screeching and speech rates. The video features include motion, cuts, luminance, faces and cognitive values.

The characteristic extraction engine 4 provides a process by which the audio data and video data may be analysed and characteristics discussed above extracted. For audio data, the data itself is typically time coded and may be analysed at a defined sampling rate discussed later. The video data is typically frame by frame data and so may be analysed frame by frame, as groups of frames or by sampling frames at intervals. Various characteristics that may be used to generate the mood vectors are described later.

The process described so far takes characteristics of audio-video content and produces values for features, as discussed. The feature values produced by the process described above relate to samples of the AV content, such as individual frames. In the case of audio analysis, multiple characteristics are combined together to give a value for features such as laughter. In the case of video data, characteristics such as motion maybe directly assessed to produce a motion feature value. In both cases, the feature values need to be combined to provide a more readily understandable representation of the metadata in the form of a complex metadata value. The metadata value is complex in the sense that it may be represented in M dimensions. A variety of such complex values are possible representing different attributes of the AV content, but the preferred example is a so-called "mood" value indicating how a viewer would perceive the features within the AV content. The main example mood vector that will be discussed has two dimensions: fast/slow and humorous/serious.

To produce the time interval mood vectors, the metadata engine 8 operates a machine learning system. The ground truth data may be from user trials where members of the general-public manually tag 3 minute clips of archive and current programmes in terms of content mood, or from user trials in which the members tag the whole programme with a single mood tag. The users tag programmes in each mood dimension to be used such as 'activity' (exciting/relaxing) generating one mood tag representing the mood of the complete programme (called whole programme user tag). The whole programme user tag and the programmes' audio/video features are used to train a mood classifier. The preferred machine learning method is Support Vector Machine (SVM) regression. Whilst the whole programme tagged classifier is used in the preferred embodiment for the time-line mood classification, other sources of ground truth could be used to train the machine learning system.

Having trained the Support Vector Machine, the metadata engine 8 may produce mood values at intervals throughout the duration of the programme. As examples, the time intervals evaluated are consecutive non-overlapping windows of 1 minute, 30 seconds and 15 seconds. The mood vector for a given interval is calculated from the features present during that time interval. This will be referred to as variable time-line mood classification.

The machine learning algorithm used to produce the mood data for this study uses a 60 s temporal window by default. During the algorithm design stage results using mood data produced with a 5 s, 10 s, 30 s, 60 s and 120 s window were compared. Out of pace, tone and vector sum the vector sum performed best, so the results for the vector sum are summarised in the table below.

| Window Length (s) | Error % | Precision % | Recall % | F1 % |
| --- | --- | --- | --- | --- |
| 5 s | 12 | 100 | 100 | 100 |
| 10 s | 5.22 | 100 | 88.3 | 93.1 |
| 30 s | 4.78 | 100 | 83.3 | 90.3 |
| 60 s | 4.43 | 100 | 83.3 | 90.3 |
| 120 s | 4.14 | 100 | 83.3 | 90.3 |

The results in the table suggest that a shorter window results in a better F1, but a longer window reduces overall error. It was judged that the increase in error was sufficiently dramatic to render the improvement in F1 insufficient to justify using a very short window length. This combined with the relative similarity in the rest of the results concluded in a decision to retain the 60 s window.

The choice of time interval can affect how the system may be used. For the purpose of identifying moods of particular parts of a programme, a short time interval allows accurate selection of small portions of a programme. For improved accuracy, a longer time period is beneficial. The choice of a fixed time interval around one minute gives a benefit as this is short in comparison to the length of most programmes, but long enough to provide accuracy of deriving the mood vector for each interval.

Characteristic Conversion

One way in which characteristics may be used to generate the mood vectors is now described for completeness.

The audio features will now be described followed by the video features.

Audio

The low level audio features or characteristics that are identified include formant frequencies, power spectral density, bark filtered root mean square amplitudes, spectral centroid and short time frequency estimation. These low level characteristics may then be compared to known data to produce a value for each feature.

Formant Frequencies.

These frequencies are the fundamental frequencies that make up human vocalisation. As laughter is produced by activation of the human vocal tract, formants frequencies are a key factor in this. A discussion of formant frequencies in laughter may be found in Szameitat et al "Interdisciplinary Workshop on the Phonetics of Laughter", Saarbrucken, 4-5 Aug. 2007 found the F1 frequencies to be much higher than for normal speech patterns. Thus, they are a key feature for identification. Formant frequencies were estimated by using Linear Prediction Coefficients. In this, the first 5 formants were used. Experimental evidence showed that this gave the best results and study of further formants was superfluous.

These first five formants were used as feature vectors. If the algorithm could not estimate five fundamental frequencies, then this window was given a special value indicating no match.

Power Spectral Density

This is a measure of amplitude for different component frequencies. For this, Welch's Method (a known approach to estimate power vs frequency) was used for estimating the signals power as a function of frequency. This gave a power spectrum, from which the mean, standard deviation and auto covariance were calculated.

Bark Filtered Root Mean Squared Amplitudes

As a follow on from looking at the power\amplitude in the whole signal using Welch's Method based on work contained in Welch, P. "The Use of Fast Fourier Transforms for the Estimation of Power Spectra: A Method Based on time Averaging over Short Modified periodgrams", *IEEE Transactions of Audio and Electroacoustics*. Vol 15, pp 70-73 (Welch 1967), the incoming signal was put through a Bark Scale Filter bank. This filtering corresponds to the critical bands of human hearing of the human ear, following Bark Scales. Once the signal was filtered into 24 bands, the Root Mean Squared amplitudes were calculated for each filter bank, and used as a feature vector.

Spectral Centroid.

The spectral centroid is used to determine where the dominant centre of the frequency spectrum is. A Fourier Transform of the signal is taken, and the amplitudes of the component frequencies are used to calculate the weighted mean. This weighted mean, along with the standard deviation and auto covariance were used as three feature values.

Short Time Frequency Estimation.

Each windowed sample is split into a sub window each 2048 samples in length. From this autocorrelation was used to estimate the main frequency of this sub-window. The average frequency of all these sub-windows, the standard deviation and auto covariance were used as the feature vectors.

The low level features or characteristics described above give certain information about the audio-video content, but in themselves are difficult to interpret, either by subsequent processes or by a video representation. Accordingly, the low level features or characteristics are combined by data comparison as will now be described.

A low level feature, such as formant frequencies, in itself may not provide a sufficiently accurate indication of the presence of a given feature, such as laughter, gun shots, tyre screeches and so on. However, by combining multiple low level features/characteristics and comparing such characteristics against known data, the likely presence of features within the audio content may be determined. The main example is laughter estimation.

Laughter Estimation

A laughter value is produced from low level audio characteristics in the data comparison engine. The audio window length in samples is half the sampling frequency. Thus, if the sampling frequency is 44.1 kHz, the window will be 22.05 k samples long, or 50 ms. There was a 0.2 sampling frequency overlap between windows. Once the characteristics are calculated, they are compared to known data (training data) using a variance on N-Dimensional Euclidean Distance. From the above characteristics extraction, the following characteristics are extracted;

Formant Frequencies Formants 1-5
Power Spectral Density Mean
   Standard Deviation
   Auto covariance
Bark Filtered RMS Amplitudes RMS amplitudes for Bark filter bands 1-23
Spectral Centroid Mean
   Standard Deviation
   Auto covariance
Short Time Frequency Estimation Mean
   Standard Deviation
   Auto covariance These 37 characteristics are then loaded into a 37 dimension characteristics space, and their distances calculated using Euclidean distance as follows;

$$(p, q) = \sqrt{\sum_{i=1}^{n}(p_i - q_i)^2}$$

This process gives the individual laughter content estimation for each windowed sample. However, in order to improve the accuracy of the system, adjacent samples are also used in the calculation. In the temporal domain, studio laughter has a definable temporal structure, the initial build up, full blown laughter followed by a trailing away of the sound.

From an analysis of studio laughter from a Sound effect library and laughter from 240 hours of AV material, it was found that the average length of the full blown laughter, excluding the build up and trailing away of the sound was around 50 ms. Thus, three windows (covering 90 ms being 50 ms in length each with a 20 ms offset) can then be used to calculate the probability p(L) of laughter in window i based upon each windows Euclidean distance from the training data d;

$p(L_i) = d(p_{i-1}, q_{i-1}) + d(p_i, q_i) + d(p_{i+1}, q_{i+1})$ where
$d(p_{i-1}, q_{i-1}) > d(p_i, q_i) < d(p_{i+1}, q_{i+1})$ and
$d(p_i, q_i) <$ threshold Once the probability of laughter is identified, a feature value can be calculated using the temporal dispersal of these identified laughter clips. Even if a sample were found to have a large probability of containing laughter, if it were an isolated incident, then the programme as a whole would be unlikely to be considered as "happy". Thus, the final probability p(L) is upon the distance d of window i;

$$dt_i = (T(p(L_i)) - T(p(L_{i-1}))) + (T(p(L_{i+1})) - T(p(L_i)))$$

$$p(L_i) = \frac{1}{e^{dt_i}}$$

To assess the algorithms described when the probability of laughter reaches a threshold of 80%, a laughter event was announced and, for checking, this was displayed as an overlaid subtitle on the video file.

Other Audio Features

Gun shots, explosions and car tyre screeches are all calculated in the same way, although without the use of formant frequencies. Speech rates are calculated using Mel Frequency Cepstrum Coefficients and formant frequencies to determine how fast people are speaking on screen. This is then used to ascertain the emotional context with which the words are being spoken. If words are being spoken in rapid succession with greater energy, there is more emotional intensity in the scene than if they are spoken at a lower rate with lower energy.

Video

The video features may be directly determined from certain characteristics that are identified are as follows.

Motion

Motion values are calculated from 32×32 pixel gray scaled version of the AV content. Motion value is produced from the mean difference between the current frame $f_k$ and the tenth previous frame $f_{k-10}$.

The motion value is:

Motion=scale*$\Sigma|f_k-f_{k-10}|$

Cuts

Cuts values are calculated from 32×32 pixel gray scaled version of the AV content. Cuts value is produced from the threshold product of the mean difference and the inverse of the phase correlation between the current frame $f_k$ and previous frame $f_{k-1}$.

The mean difference is:

md=scale*$\Sigma|fk-fk_{-1}|$

The phase correlation is:

pc=max(invDFT((DFT($f_k$)*(DFT($f_{k-1}$))/|(DFT($f_k$)*(DFT($f_{k-1}$)')|)))

The cuts value is:

Cuts=threshold(md*(1−pc))

Luminance

Luminance values are calculated from 32×32 pixel gray scaled version of the AV content. Luminance value is the summation of the gray scale values:

Luminance=$\Sigma f_k$

Change in lighting is the summation of the difference in luminance values. Constant lighting is the number of luminance histogram bins that are above a threshold.

Face

Face value is the number of full frontal faces and the proportion of the frame covered by faces for each frame. Face detection on the gray scale image of each frame is implemented using a mex implementation of OpenCV's face detector from Matlab central. The code implements Viola-Jones adaboosted algorithm for face detection.

Cognitive

Cognitive features are the output of simulated simple cells and complex cells in the initial feed forward stage of object recognition in the visual cortex. Cognitive features are generated by the 'FH' package of the Cortical Network Simulator from Centre for Biological and Computational Learning, MIT.

As previously described the invention may be implemented in systems or methods, but may also be implemented in program code executable on a device, such as a set top box, or on an archive system or on a personal device.

Alternative implementations include a set top box, larger scale machines for retrieval and display of television programme archives containing thousands of programmes and smaller scale implementations such as personal audio video players, smart phones, tablets and other such devices.

The invention claimed is:

1. A controller for controlling the output of audio-video content, comprising:
   an input for receiving audio-video content;
   a vector engine arranged to receive the audio-video content and to produce a continuous metadata value of M dimensions, at intervals;
   a low pass filter arranged to receive the continuous metadata value and to pass changes below a threshold to a hysteresis filter, the changes comprising a filtered complex continuous metadata value;
   the hysteresis filter arranged to receive the filtered complex continuous metadata value and to produce a binary output from results of the hysteresis filter and the low pass filter, wherein the hysteresis filter has a deviation between top and bottom thresholds as a function of the standard deviation of the continuous metadata value; and
   a retrieval module arranged to receive the binary output and to assert a control signal to allow control of the audio-video content in dependence on the binary output.

2. A controller according to claim 1, wherein the audio-video content comprises a programme.

3. A controller according to claim 1, wherein the audio-video content comprises a live feed.

4. A controller according to claim 1 wherein the binary output indicates the presence of chapter points.

5. A controller according to claim 1, wherein the continuous metadata value indicates one or more of rate, pace, tone or other mood information.

6. A controller according to claim 1, wherein the hysteresis filter has a centre point determined by taking the average of samples of the filtered complex continuous metadata value.

7. A controller according to claim 6, wherein the centre point is determined by taking the average of selected maximum and minimum samples.

8. A controller according to claim 1, wherein the retrieval module is arranged to store chapter points for the audio-video content.

9. A controller according to claim 1, wherein the retrieval module is arranged to select alternative audio-video content if the binary output changes state.

10. A method for controlling the output of audio-video content, comprising:
    receiving audio-video content;
    producing, using a vector engine, a continuous metadata value of M dimensions, at intervals from the audio-video content;
    filtering, using a low pass filter arranged to receive the continuous metadata value and to pass changes below a threshold to a hysteresis filter, the changes comprising a filtered complex continuous metadata value;
    filtering, using the hysteresis filter arranged to receive the filtered complex continuous metadata value and to produce a binary output from results of the hysteresis filter and the low pass filter, wherein the hysteresis filter has a deviation between top and bottom thresholds as a function of the standard deviation of the continuous metadata value; and
    asserting a control signal derived from the binary output to allow control of the audio-video content in dependence on the binary output.

11. A method according to claim 10, wherein the audio-video content comprises a programme.

12. A method according to claim 10, wherein the audio-video content comprises a live feed.

13. A method according to claim 10, wherein the binary output indicates the presence of chapter points.

14. A method according to claim 10, wherein the continuous metadata value indicates one or more of rate, pace, tone or other mood information.

15. A method according to claim 10, wherein the hysteresis filter has a centre point determined by taking the average of samples of the filtered complex continuous metadata value.

16. A method according to claim 15, wherein the centre point is determined by taking the average of selected maximum and minimum samples.

17. A method according to claim 10, wherein the retrieval module is arranged to store chapter points for the audio-video content.

18. A method according to claim 10, wherein the retrieval module is arranged to select alternative audio-video content if the binary output changes state.

19. A non-transitory computer-readable medium comprising computer-executable instructions, which when executed by one or more processors, cause the one or more processors to:
   receive audio-video content;
   receive the audio-video content and to produce a continuous metadata value of M dimensions, at intervals;
   receive, through a low pass filter, the continuous metadata value and to pass changes below a threshold to a hysteresis filter, the changes comprising a filtered complex continuous metadata value;
   receive, through the hysteresis filter, the filtered complex continuous metadata value and to produce a binary output from results of the hysteresis filter and the low pass filter, wherein the hysteresis filter has a deviation between top and bottom thresholds as a function of the standard deviation of the continuous metadata value;
   receive the binary output and to assert a control signal to allow control of the audio-video content in dependence on the binary output.

20. A device comprising:
   a controller for controlling the output of audio-video content, the controller including:
     an input for receiving audio-video content;
     a vector engine arranged to receive the audio-video content and to produce a continuous metadata value of M dimensions, at intervals;
     a low pass filter arranged to receive the continuous metadata value and to pass changes below a threshold to a hysteresis filter, the changes comprising a filtered complex continuous metadata value;
     the hysteresis filter arranged to receive the filtered complex continuous metadata value and to produce a binary output from results of the hysteresis filter and the low pass filter, wherein the hysteresis filter has a deviation between top and bottom thresholds as a function of the standard deviation of the continuous metadata value; and
   a retrieval module arranged to receive the binary output and to assert a control signal to allow control of the audio-video content in dependence on the binary output.

* * * * *

UNITED STATES PATENT AND TRADEMARK OFFICE
CERTIFICATE OF CORRECTION

PATENT NO. : 10,701,459 B2
APPLICATION NO. : 15/739411
DATED : June 30, 2020
INVENTOR(S) : Simon Rankine It is certified that error appears in the above-identified patent and that said Letters Patent is hereby corrected as shown below:

In the Specification

Column 8, Line 15, delete "$(p,q) = \sqrt{\sum_{i=1}^{n}(p_i - q_i)^2}$" and replace with --$d(p,q) = \sqrt{\sum_{i=1}^{n}(p_i - q_i)^2}$--

Signed and Sealed this
Eighteenth Day of August, 2020

Andrei Iancu
*Director of the United States Patent and Trademark Office*